United States Patent
Jantzi et al.

(10) Patent No.: US 10,158,978 B1
(45) Date of Patent: Dec. 18, 2018

(54) UPDATING A DEVICE POSITION ACCORDING TO HEADING AND MOVEMENT

(71) Applicant: BlackBerry Limited, Waterloo (CA)

(72) Inventors: Jason Wayne Jantzi, St. Clements (CA); Mahendra Fuleshwar Prasad, Waterloo (CA); Scott Leonard Dill, Paris (CA); Jesse William Bennett, Apex, NC (US); Alexander John Ogle, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 0 days.

(21) Appl. No.: 15/784,523

(22) Filed: Oct. 16, 2017

(51) Int. Cl.
*H04W 64/00* (2009.01)
*H04W 4/02* (2018.01)
*H04W 4/38* (2018.01)
*H04W 4/021* (2018.01)

(52) U.S. Cl.
CPC .......... *H04W 4/027* (2013.01); *H04W 4/021* (2013.01); *H04W 4/026* (2013.01); *H04W 4/38* (2018.02)

(58) Field of Classification Search
CPC ....... H04W 84/18; H04W 4/02; H04W 4/028; H04W 24/02; H04W 48/12; H04W 64/00; H04L 5/0048; H04L 63/30
USPC .......... 455/423, 456.1, 426.1; 701/300, 423; 340/8.1
See application file for complete search history.

(56) References Cited

U.S. PATENT DOCUMENTS

2014/0278044 A1* 9/2014 Jacobs ............... G06F 17/00
701/300
2015/0241235 A1* 8/2015 Lobato Fregoso et al. ...............
G01C 21/36
701/423

OTHER PUBLICATIONS

Wikipedia, Dead reckoning last modified Feb. 18, 2017 (10 pages).
Wikipedia, Inertial navigation system last modified Apr. 12, 2017 (21 pages).
Hermsen, Harm, Master Thesis, University of Groningen, The Netherlands, Using GPS and Accelerometer Data for Rowing Race Tracking, Oct. 2013 (54 pages).
OxTS Inertial + GPS, What is Inertial Navigation Systems Guide Life before GPS, http://www.oxts.com/whatisinertialnavigationsystemsguide/ downloaded Apr. 12, 2017 (9 pages).

* cited by examiner

*Primary Examiner* — Phuoc H Doan
(74) *Attorney, Agent, or Firm* — Trop, Pruner & Hu, P.C.

(57) ABSTRACT

In some examples, a system receives, over a network, position data acquired by a position sensor of a device, and sensor data acquired by a further sensor of the device while the position sensor of the device is inactive, the sensor data from the further sensor indicating a direction of travel of the device. The system determines, using the sensor data acquired by the further sensor of the device, a heading and movement of the device relative to a position indicated by the position data, and updates a position of the device according to the determined heading and movement.

20 Claims, 4 Drawing Sheets

UPDATING A DEVICE POSITION ACCORDING TO HEADING AND MOVEMENT

BACKGROUND

A device can include a position sensor that can be used to make measurements to determine a position of the device. In some cases, position sensors include global positioning system (GPS) sensors. A GPS sensor can consume a relatively large amount of power.

BRIEF DESCRIPTION OF THE DRAWINGS

Some implementations of the present disclosure are described with respect to the following figures.

Figure 1:
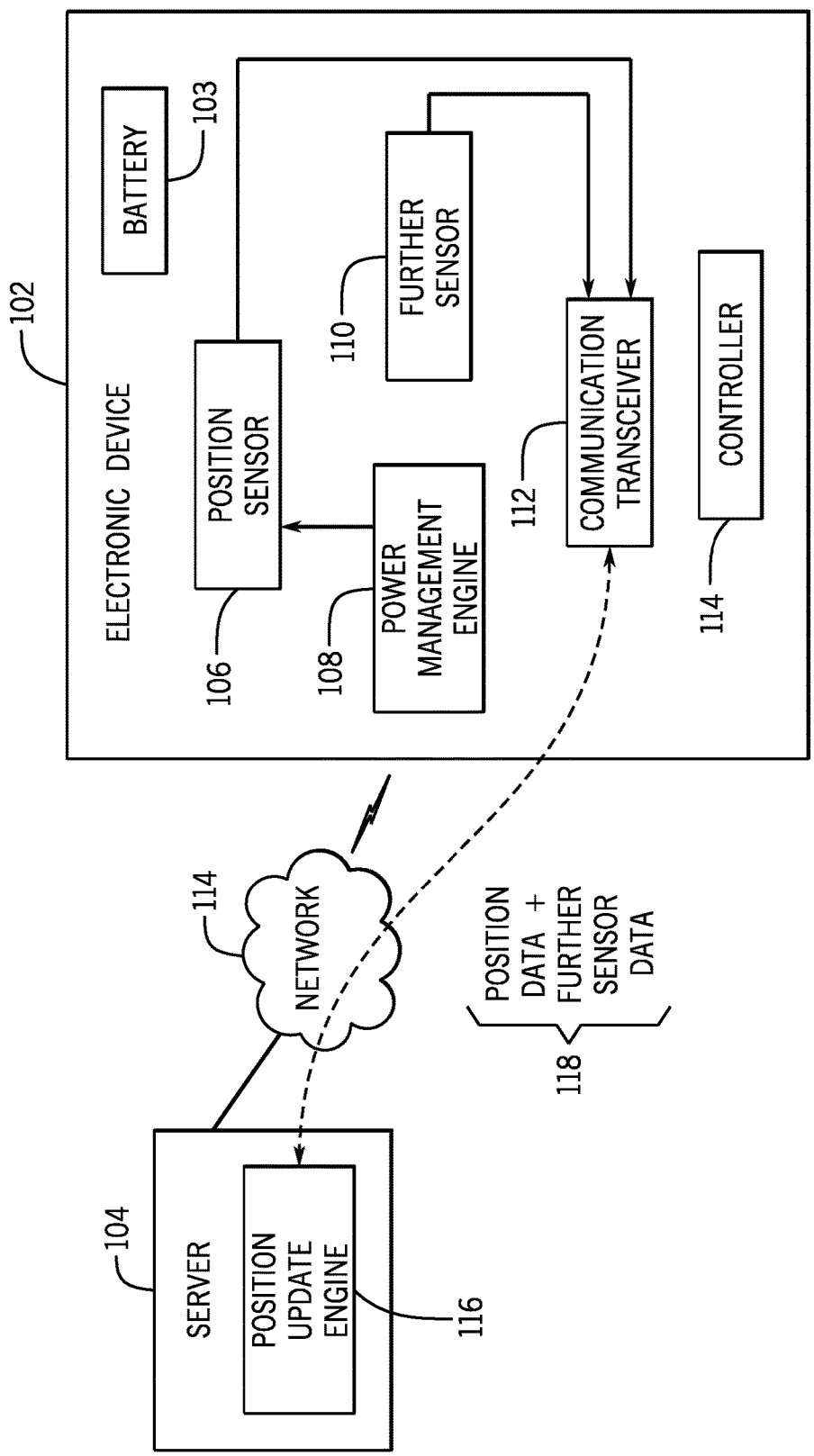
FIG. 1 is a block diagram of an example arrangement including an electronic device and a server with a position update engine according to some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Some electronic devices can run on the power of a battery or another power source with a restricted power capacity. Examples of such electronic devices include smartphones, wearable devices (e.g., smart watches, smart eyeglasses, head-mounted devices, etc.), set-top boxes, sensor devices, household appliances, vehicles (or electronic components in vehicles), Internet-of-Things (IoT) devices, and so forth.

In some examples, electronic devices, such as IoT devices including sensors, can be mounted on a moveable platform. A moveable platform can include a trailer or other cargo transportation unit (CTU), or a vehicle, such as a truck, a tractor, a car, a railed vehicle (e.g., a train), a watercraft (e.g., a ship), an aircraft, a spacecraft, and so forth.

Electronic devices can include position sensors, such as global positioning system (GPS) sensors. When activated, a position sensor can consume a relatively large amount of power, which can quickly deplete a battery or another restricted capacity power source in an electronic device.

To reduce power consumption by a position sensor, the position sensor can be deactivated at certain times, so that the position sensor acquires position data less frequently.

However, deactivating a position sensor to reduce power consumption of the position sensor can reduce the accuracy of the position sensor. Therefore, there is a tradeoff between battery life and position sensor accuracy. If the position sensor is continuously activated or activated at more frequent intervals for location tracking, then battery life can be shortened in the electronic device. On the other hand, if the position sensor is activated less frequently, then position accuracy can be degraded, while power consumption of the electronic device can be reduced so that battery life can be extended.

In accordance with some implementations of the present disclosure, to determine a position of an electronic device, sensor data from at least one further sensor of the electronic device can be used to supplement position data acquired by a position sensor. The further sensor is another sensor that is distinct from the position sensor. The further sensor can acquire the further sensor data while the position sensor is inactive, such as during a low power mode of the electronic device.

In accordance with alternative implementations of the present disclosure, position data from a position sensor and sensor data from a further sensor can be used to determine a position on a moveable platform that is offset from the position of the position sensor, which is mounted on the moveable platform.

FIG. 1 is a block diagram of an example arrangement that includes an electronic device 102 and a server 104. Although FIG. 1 shows just one electronic device 102, it is noted that in additional examples, there can be multiple electronic devices 102 that include respective position sensors.

The electronic device 102 can be carried by a user or mounted on a moveable platform. In the context of being mounted on a moveable platform, the electronic device 102 can be part of an IoT device that is used to measure various parameters associated with the moveable platform on which the IoT device is mounted. Examples of the parameters can include temperature, a load status of the moveable platform (i.e., whether the moveable platform is loaded with cargo or human occupants), pressure, humidity, characteristics of components (such as brakes, wheels, tires, engines, etc.) of the moveable platform, and so forth.

The electronic device 102 includes a battery 103 that supplies power to components of the electronic device 102 when the electronic device 102 is not electrically connected to an external power source, such as a wall power outlet, an external battery, and so forth.

The electronic device 102 includes a position sensor 106 for acquiring position data that can be measured by the position sensor 106. In some examples, the position sensor is a GPS sensor, which can receive signals from satellites of a satellite navigation system. In other examples, the position sensor 106 can be a different type of position sensor, such as a position sensor that is able to measure signals transmitted by base stations or access points, which are fixed-position wireless transmitters. Based on triangulation using signals from multiple fixed-position transmitters, the position sensor 106 is able to determine a position of the electronic device 102. Base stations are part of a cellular access network, while access points are part of a wireless local area network (WLAN).

The electronic device 102 further includes a power management engine 108, which can manage the power of the electronic device 102. For example, to place the electronic device 102 into a lower power state, the power management engine 108 can deactivate one or more components in the electronic device 102. A component that consumes a substantial amount of power when on is the position sensor 106. Deactivating the position sensor 106 can help to reduce overall power consumption of the electronic device 102, which can reduce the rate at which charge of the battery 102 is depleted.

A lower power state of the electronic device 102 can refer to a state in which power is removed from the electronic device 102, or power is removed from one or more electronic components in the electronic device 102. The one or more electronic components from which power is removed can include any or some combination of the following: a processor, a memory device, a storage device, a network interface controller, a graphics controller, the position sensor 106, and so forth.

As used here, the term "engine" can refer to any or some combination of the following: a hardware processing circuit, such as a microprocessor, a core of a multi-core microprocessor, a microcontroller, a programmable integrated circuit device, a programmable gate array, or any other type of hardware processing circuit. In other examples, the term "engine" can refer to a combination of a hardware processing circuit and machine-readable instructions executable on the hardware processing circuit.

The power management engine 108 can control when the position sensor 106 is activated such that the position sensor 106 can take measurements to determine a position of the electronic device 102, and when the position sensor 106 is deactivated such that the position sensor 106 does not take measurements.

Alternatively, instead of controlling the activation and deactivation of the position sensor 106 using the power management engine 108, the activation/deactivation of the position sensor 106 can be performed autonomously by the position sensor 106, such as based on a fix profile sent to the position sensor 106 by the server 104. The fix profile can include information indicating that the position sensor 106 is to periodically turn on, at a specified period, to obtain a fix of a current position of the electronic device 102. Alternatively, the fix profile can include information indicating that the position sensor 106 is to turn on in response to an specified event.

The electronic device 102 further includes a further sensor 110 that can acquire measurement data regarding a characteristic associated with the electronic device 102. For example, the further sensor 110 can include an accelerometer to measure acceleration data (due to movement of the electronic device 102), a gyroscope to measure an orientation of the electronic device 102, a magnetometer to measure a magnetic field, and/or any other type of sensor.

Although just one further sensor 110 is shown in FIG. 1, it is noted that in other examples, the electronic device 102 can include additional further sensors. Similarly, the electronic device 102 can include multiple position sensors.

In some examples, the power management engine 108 can maintain the further sensor 110 in the activated state (to acquire measurement data) while the position sensor 106 is deactivated. This allows the further sensor 110 to acquire sensor data that can be used to determine the position of the electronic device 102 while the position sensor 106 is inactive.

The electronic device 102 further includes a communication transceiver 112, which can be used by the electronic device 102 to communicate over a network 114. The communication transceiver 110 can be a wireless transceiver, which allows the electronic device 102 to perform wireless communications over the network 114 with the server 104 or another system or device.

A wireless network can include a cellular network or a wireless local area network (WLAN). An example cellular network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular networks can be employed, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and so forth. In further examples, cellular networks can be fifth generation (5G) or beyond cellular networks.

A WLAN can operate according to the Institute of Electrical and Electronic Engineers (IEEE) 802.11 or Wi-Fi Alliance Specifications. In other examples, other types of wireless networks can be employed, such as a Bluetooth link, a ZigBee network, and so forth. Additionally, some wireless networks can enable cellular IoT, such as wireless access networks according to LTE Advanced for Machine-Type Communication (LTE-MTC), narrowband IoT (NB-IoT), and so forth.

The server 104 can be implemented as a computer or as a collection of computers. In some examples, the server 104 can include a web server, a server in a cloud, or any other type of system that is able to communicate with the electronic device 102. The server 104 includes a position update engine 116, which is able to determine a position of the electronic device 102 based on position data acquired by the position sensor 106 and further sensor data acquired by the further sensor 110.

Collectively, the position data and the further sensor data are referred to as "device sensor data" 118. The communication transceiver 112 sends the device sensor data 118 to the server 104 in one or more data packets.

Since the position sensor 106 of the electronic device 102 can be deactivated (turned off or placed into a lower power state) by the power management engine 108 at certain time intervals, the position data acquired by the position sensor 106 may become out of date when the electronic device 102 is moving and the position sensor 106 has not been activated to acquire further position data. Activating the position sensor 106 can be expensive in terms of power usage, which can deplete the charge of the battery 103. Rather than re-activate the position sensor 106 to acquire a new position fix of the electronic device 102, techniques or mechanisms according to some implementations use the position update engine 116 in the server 104 to update the position of the electronic device 102 using the position data acquired by the position sensor 106 (when the position sensor 106 was previously active) and further sensor data from the further sensor 110 which is able to acquire the further sensor data while the position sensor 106 is inactive. In this way, by using the combination of the position data (which represents the position of the electronic device 102 at a prior point in time) and the further sensor data (which was acquired more recently than the position data of the position sensor 106), the position update engine 116 is able to update the position of the electronic device 102, without having to re-activate the position sensor 106.

The further sensor 110 when active can consume less power than the position sensor 106 when active. Thus, by using the further sensor 110 to update the position of the electronic device 102, without re-activating the position sensor 106, overall power consumption of the electronic device 102 can be reduced.

The electronic device 102 further includes a controller 114, which can control various functionalities of the electronic device 102. The controller 114 can be implemented as a hardware processing circuit or a combination of a hardware processing circuit and machine-readable instructions executable on the hardware processing circuit.

Figure 2:
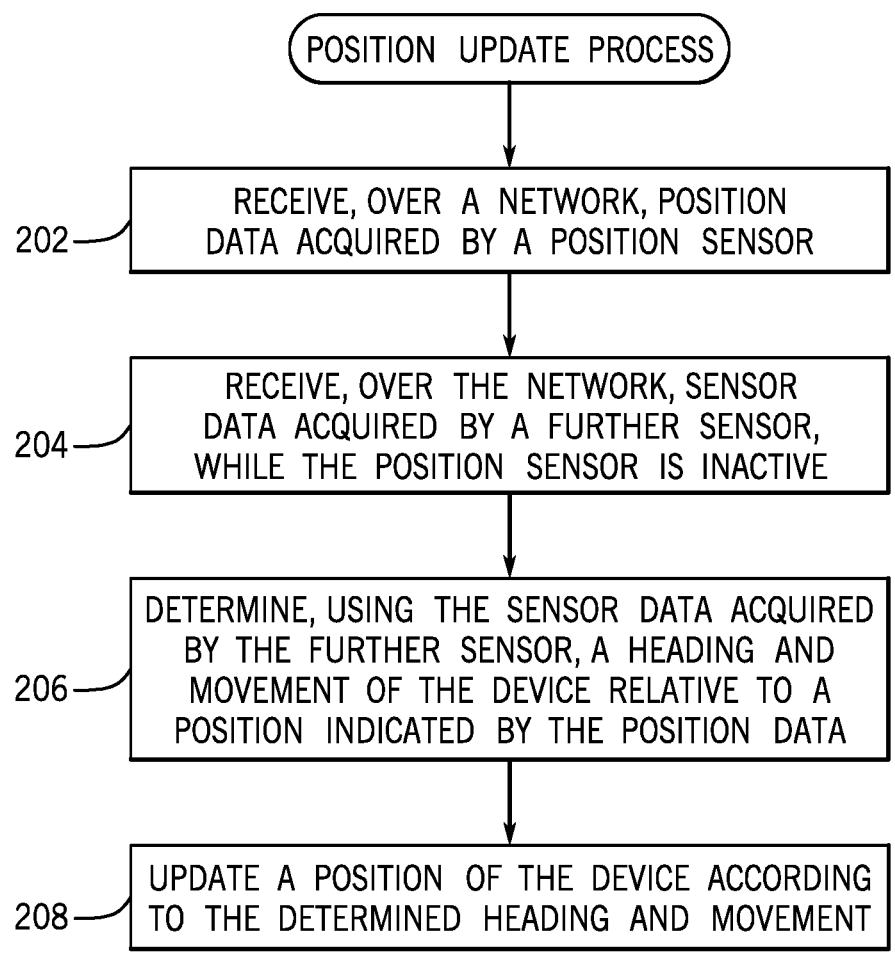
FIG. 2 is a flow diagram of position update process, according to some implementations.

FIG. 2 is a flow diagram of a process of the position update engine 116 according to some examples. The position update engine 116 receives (at 202), over the network 114, position data from the position sensor 106. The position data was acquired by the position sensor 106 when the position sensor 106 was active at a previous point in time.

The position update engine 116 further receives (at 204), over the network 114, sensor data acquired by at least one further sensor 110 of the electronic device 102, while the position sensor 106 of the electronic device 102 is inactive. The further sensor data acquired by the at least one further sensor 110 indicates a direction of travel of the electronic device 102, assuming that the electronic device 102 is moving.

The position update engine 116 determines (at 206), using the further sensor data acquired by the further sensor, a heading and movement of the electronic device 102 relative to the position indicated by the position data. The heading and movement can be determined using the further sensor data acquired by one further sensor, or by multiple further sensors.

A heading of the electronic device 102 refers to a general direction of motion of the electronic device 102. The heading of the electronic device 102 can be based on use sensor data from any or some combination of the following: an accelerometer, a gyroscope, a magnetometer, or any other type of sensor that can be used to determine an orientation of the electronic device 102.

The determined movement of the electronic device 102 can refer to some indication of how much the electronic device 102 has moved over a given time duration, such as the time duration since the position sensor 106 was last active. The indication of the amount of movement can be based on acceleration data, a velocity sensor, and so forth. The velocity of the electronic device 102 at any given point in time can be based on acceleration data produced by an accelerometer. In other examples, the velocity of the electronic device 102 can be based on measurements by a speedometer or another type of sensor.

Next, the position update engine 116 updates (at 208) a position of the electronic device 102 according to the determined heading and movement.

In some implementations, the update of the position of the electronic device 102 is performed by the position update engine 116 in a non-real-time manner. Performing the position update in the non-real-time manner can refer to updating the position of the electronic device 102 after a time lag since the electronic device 102 has moved.

In some examples, device sensor data 118 can be acquired by the electronic device 102 over a time duration, during which the electronic device 102 may have alternated between being stationary and being in motion. During this time duration, the position update engine 116 can receive multiple instances of the device sensor data 118 at corresponding different time points. The position sensor 106 was inactive for at least a portion of the time duration. Using the multiple instances of the device sensor data 118 at different time points, the position update engine 116 can update the position of the electronic device 102.

The multiple instances of the device sensor data 118 can indicate respective different headings and amounts of movement of the electronic device 102. The position update engine 116 can aggregate the different headings and amounts of movement indicated by the multiple instances of the device sensor data 118 to derive an overall heading and movement that can be used to update the position of the electronic device 102.

In further examples, the position update engine 116 can update the position of the electronic device 102 in response to an event. The event can be a time-based event. For example, the position update engine 116 can update the position of the electronic device 102 periodically. In other examples, the event can be an event related to the movement of the electronic device 102. For example, when the electronic device 102 has come to a stop, the electronic device 102 can send another instance of the device sensor data 118 to the position update engine 116. In response to receive of the other instance of the device sensor data 118 or in response to an indication that the electronic device 102 has stopped, the position update engine 116 can be triggered to update the position of the electronic device 102.

The determination of whether the electronic device 102 has stopped can be based on acceleration data acquired by an accelerometer (an example of the further sensor 110) in the electronic device 102.

The controller 114 (FIG. 1) in the electronic device 102 can detect that the electronic device 102 has stopped based on the acceleration data. In response to detecting that the electronic device 102 has stopped, the controller 114 can send, over the network 114, the indication that the electronic device 102 has stopped to the position update engine 116.

Figure 3:
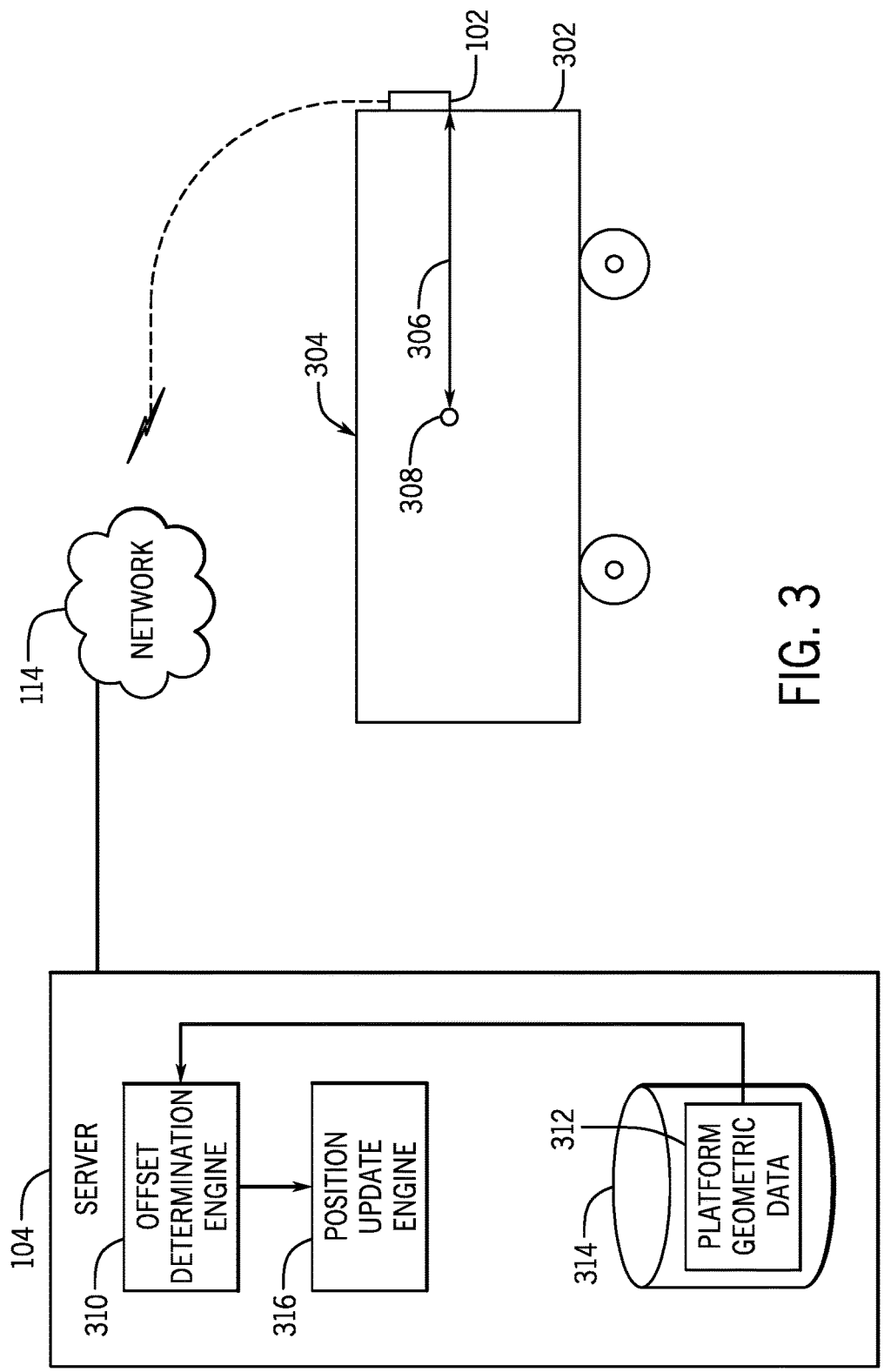
FIG. 3 is a block diagram of an example arrangement including moveable platform and a server with an offset determination engine and a position update engine, according to alternative implementations.

In further examples, when the electronic device 102 is mounted on a moveable platform, the electronic device 102 may be located at a part of the moveable platform other than at a center (or central portion) of the moveable platform. For example, as shown in FIG. 3, the electronic device 102 can be attached to a rear side 302 of a moveable platform 304. In the example of FIG. 3, the moveable platform 304 is in the form of a trailer, which can be hauled by a tractor. In other examples, the moveable platform 304 can be another type of vehicle.

Since the electronic device 102 is attached to the rear side 302 of the moveable platform 304 in the example of FIG. 3, it can be difficult to judge the exact position of the moveable platform 304, particularly in a crowded environment such as a parking lot where there can be multiple moveable platforms parked close to each other.

In accordance with alternative implementations of the present disclosure, techniques or mechanisms are provided to determine an offset 306 between the location of the electronic device 102 (at the rear side 302 in the example of FIG. 3) and a target location 308 of the moveable platform 304. In some examples, the target location 308 is at the center or in a central portion of the moveable platform 304. The target location 308 is closer to a center of the moveable platform 304 than the position of the electronic device 102. In other examples, the target location 308 can be a different location (e.g., front side, top side, bottom side, etc.) on the moveable platform 304.

The server 104 includes an offset determination engine 310 to compute the offset 306 between the location of the electronic device 102 and the target location 308. The determination of the offset 306 is based on a determined heading (as determined from further sensor data acquired by the further sensor 110 of the electronic device 102) and a geometry of the moveable platform 304.

The geometry of the moveable platform 304 can include a known distance between the rear side 302 of the moveable platform 304 and the target location 308. The geometry of the moveable platform 304 is indicated by platform geometric data 312 stored in a storage medium 314. The storage medium 314 can be part of the server 104 or can be separate from but accessible by the server 104.

Different moveable platforms can have different geometries. As a result, the storage medium 314 can store multiple platform geometric data 312 for the respective different moveable platforms.

The server 104 also includes a position update engine 316, which is used to update the position of the moveable platform 304 based on the computed position of the electronic device 102 (such as by using techniques and mechanisms according to FIGS. 1 and 2) and based on the computed offset 306. For example, the position update engine 316 can determine the position of the moveable platform 304 according to the following procedure:

1) compute the position of the electronic device 102, such as according to the process of FIG. 2;
2) receive the computed offset 306 from the offset determination engine 310; and
3) sum the computed offset 306 to the computed position of the electronic device 102 (note that the summing can including adding or subtracting the computed offset 306 to or from the computed position of the electronic device 102, depending upon whether the target location 308 is in front of or behind the electronic device 102).

Figure 4:
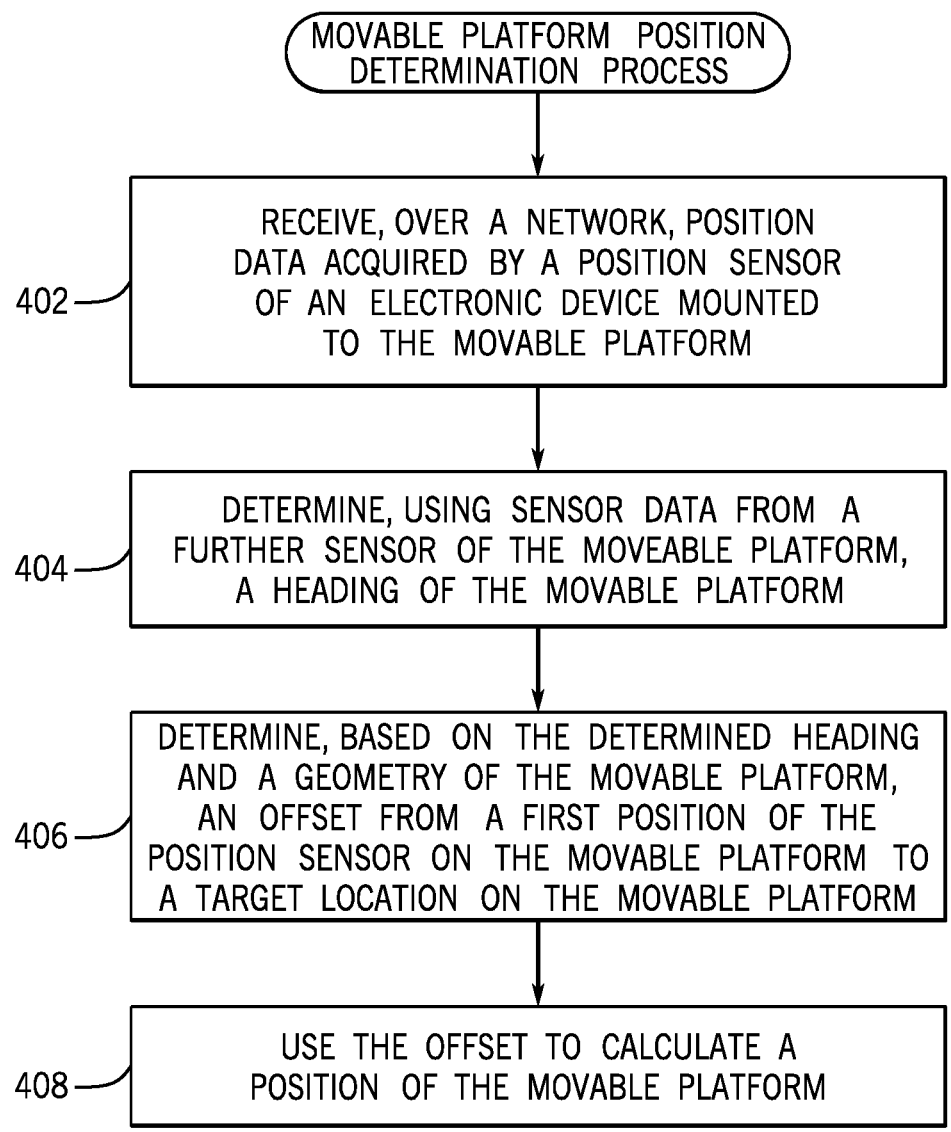
FIG. 4 is a flow diagram of a moveable platform position determination process, according to further implementations.

FIG. 4 is a flow diagram of a moveable platform position determination process performed by the server 104 of FIG. 3 (and more specifically, by the combination of the offset determination engine 310 and the position update engine 316) according to some examples. The server 104 receives (at 402), over the network 114, position data acquired by a position sensor (e.g., 106) of the electronic device 102 mounted to the moveable platform 304. The server 104 determines (at 404), using sensor data from a further sensor (e.g., 110) of the moveable platform 304, a heading of the moveable platform 304.

The server 104 determines (at 406), based on the determined heading and a geometry of the moveable platform 304, the offset 306 from a first position of the position sensor on the moveable platform to the target location 308 on the moveable platform.

The server 104 uses (at 408) the offset 306 to calculate a position of the moveable platform 304. In some examples, the position of the moveable platform 304 can be computed while the moveable platform 304 is stationary. In other examples, the position of the moveable platform 304 can be computed while the moveable platform 304 is in motion. In such examples, the position of the moveable platform 304 can be determined based on position data acquired by the position sensor 106, sensor data acquired by the further sensor 110 (from which a heading and movement can be determined such as according to FIG. 2), and the computed offset 306.

In some examples, based on the computed position of the moveable platform 304, the server 104 is able to determine a position of the moveable platform 304 relative to a geofence. A geofence specifies a geographic area. For example, the geofence can define a parking lot or dock yard. As another example, the geofence can define a geographic area where a moveable platform should (or should not) be located, such as at a given point in time. The moveable platform 304 being within the geofence or outside the geofence can trigger performance of a specified action, such as the triggering of an alarm if the moveable platform 304 is outside the geofence (or inside the geofence), and so forth.

In examples where the position update engine 116 (FIG. 1) or 316 (FIG. 3) or the offset determination engine 310 (FIG. 3) includes machine-readable instructions, the machine-readable instructions are stored in a non-transitory machine-readable or computer-readable storage medium. The storage medium can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
at least one processor configured to:
receive, over a network, position data acquired by a position sensor of a device;
receive, over the network, sensor data acquired by a further sensor of the device while the position sensor of the device is inactive, the sensor data from the further sensor indicating a direction of travel of the device;
determine, using the sensor data acquired by the further sensor of the device, a heading and movement of the device relative to a position indicated by the position data;
update a position of the device according to the determined heading and movement; and
receive, over the network, an indication that the device has stopped,
the updating of the position of the device further based on the indication that the device has stopped.

2. The system of claim 1, wherein the received sensor data comprises sensor data acquired by an accelerometer or a velocity sensor.

3. The system of claim 1, wherein the received sensor data comprises sensor data acquired by a gyroscope.

4. The system of claim 1, wherein the received sensor data comprises sensor data acquired by a magnetometer.

5. The system of claim 1, wherein the updating of the position of the device comprises a non-real-time update by the at least one processor.

6. The system of claim 1, wherein the device is part of a moveable platform, and the at least one processor is configured to:
   determine, based on the determined heading and a geometry of the moveable platform, an offset from a first position of the position sensor on the moveable platform to a second position on the moveable platform,
   the updating of the position further based on the determined offset.

7. The system of claim 5, wherein the non-real-time update occurs over a time duration in which the device has alternated between being stationary and being in motion.

8. The system of claim 7, wherein the position sensor was inactive for at least a portion of the time duration.

9. A system comprising:
   at least one processor configured to:
      receive, over a network, position data acquired by a position sensor of a moveable platform;
      determine, using sensor data acquired by a further sensor of the moveable platform, a heading of the moveable platform;
      determine, based on the determined heading and a geometry of the moveable platform, an offset from a first position of the position sensor on the moveable platform to a second position on the moveable platform; and
      use the offset to calculate a position of the moveable platform.

10. The system of claim 9, wherein the position sensor is mounted to a first portion of the moveable platform, and the determined offset is a distance from the first portion to a second portion of the moveable platform.

11. The system of claim 10, wherein the moveable platform comprises a vehicle or a cargo transportation unit that carries cargo, wherein the position sensor is mounted to the first portion of the vehicle or the cargo transportation unit, and the determined offset is the distance from the first portion of the vehicle or the cargo transportation unit to the second portion of the vehicle or the cargo transportation unit.

12. The system of claim 9, wherein the at least one processor is configured to determine a position of the moveable platform relative to a geofence, based on the calculated position.

13. The system of claim 9, wherein the sensor data from the further sensor comprises sensor data from a gyroscope or a magnetometer.

14. The system of claim 9, wherein the second position is closer to a center of the moveable platform than the first position.

15. The system of claim 9, wherein the calculated position of the moveable platform is a position of the moveable platform that is stationary.

16. A non-transitory machine-readable storage medium storing instructions that upon execution cause a system to:
   receive, over a network, position data acquired by a position sensor of a device on a moveable platform;
   receive, over the network, sensor data acquired by a further sensor of the device, the sensor data from the further sensor indicating a direction of travel of the device;
   determine, using the sensor data from the further sensor of the device, a heading and movement of the device relative to a position indicated by the position data;
   determine, based on the determined heading and a geometry of the moveable platform, an offset from a first position of the position sensor on the moveable platform to a second position on the moveable platform; and
   perform non-real-time updating of a position of the moveable platform according to the determined heading and movement and the determined offset.

17. The non-transitory machine-readable storage medium of claim 16, wherein the sensor data is acquired by the further sensor while the position sensor is inactive for power saving.

18. The non-transitory machine-readable storage medium of claim 16, wherein the non-real-time updating occurs over a time duration in which the device has alternated between being stationary and being in motion.

19. The non-transitory machine-readable storage medium of claim 18, wherein the position sensor was inactive for at least a portion of the time duration.

20. The non-transitory machine-readable storage medium of claim 16, wherein the moveable platform comprises a vehicle or a cargo transportation unit that carries cargo, and wherein the position sensor is mounted to a first portion of the vehicle or the cargo transportation unit, and the determined offset is a distance from the first portion of the vehicle or the cargo transportation unit to a second portion of the vehicle or the cargo transportation unit.

* * * * *